United States Patent [19]

Laurent et al.

[11] Patent Number: 5,609,705
[45] Date of Patent: Mar. 11, 1997

[54] CORD REINFORCEMENT OF RUBBER MATERIAL

[75] Inventors: Daniel Laurent, Meylan; Miguel Torres Castellano, Ceyrat, both of France

[73] Assignee: Sedepro, Paris, France

[21] Appl. No.: 535,884

[22] Filed: Sep. 28, 1995

[30] Foreign Application Priority Data

Sep. 29, 1994 [FR] France .................................. 94 11776

[51] Int. Cl.[6] .............................. B29D 30/08; B32B 5/00
[52] U.S. Cl. ......................... 156/117; 156/177; 156/397; 156/439; 156/520; 156/906
[58] Field of Search ................................ 156/117, 123, 156/133, 137, 405.1, 406.4, 397, 177, 178, 179, 297, 407, 439, 440, 519, 520, 906, 907; 28/100, 101, 102; 66/84 A

[56] References Cited

U.S. PATENT DOCUMENTS

| | | |
|---|---|---|
| 1,894,237 | 1/1933 | Mallory . |
| 2,441,071 | 5/1948 | Jahant . |
| 3,607,563 | 9/1971 | Bagnall .................................. 156/177 |
| 3,894,906 | 7/1975 | Pearce et al. ........................... 156/512 |
| 4,804,436 | 2/1989 | Debroche et al. ...................... 156/397 |
| 5,174,939 | 12/1992 | Siegenthaler . |
| 5,281,289 | 1/1994 | Debroche et al. ...................... 156/397 |
| 5,380,388 | 1/1995 | Montagne et al. ..................... 156/177 |

FOREIGN PATENT DOCUMENTS

| | | |
|---|---|---|
| 3215604 | 11/1983 | Germany . |
| 191739 | 3/1924 | United Kingdom . |

Primary Examiner—Geoffrey L. Knable
Attorney, Agent, or Firm—Brumbaugh, Graves, Donohue & Raymond

[57] ABSTRACT

A process and apparatus for arranging cut lengths of reinforcement cords in parallel on a moving rubber surface by feeding the cord into successive cord receiving receptacles on a rotor, cutting predetermined lengths of the cords introduced into the receptacles, removing the cords from the receptacles by a comb which intermeshes with the rotor and advancing and guiding the parallel cords onto the moving rubber surface.

12 Claims, 5 Drawing Sheets

CORD REINFORCEMENT OF RUBBER MATERIAL

BACKGROUND OF THE INVENTION

The present invention relates to the reinforcement by cords of a matrix of rubber material. In particular, the present invention relates to the manufacture of tires, and more particularly the manufacture of reinforcement armatures, whatever the place in a tire where it is contemplated to make or use such a reinforcement.

The term "cord" is to be understood in a very broad sense, covering a monofilament, a multifilament, a cable, a twist, or an equivalent assembly, and this whatever the material constituting the cord or the treatment which it has undergone, for instance a surface treatment in order to promote adherence of a cord on a support on which it is deposited or the intimate bonding of the cord with the rubber.

When reference is made in the present specification to lengths of cord, the meaning is to pieces of cord which have been individualized by cutting.

In the present specification, "strip" refers to a semi-finished product having the shape of a ribbon, of relatively slight width, comprising a matrix of rubber material in which reinforcement cords which extend transversely in said strip are embedded, or at least fixed by bonding. The width is considered slight when it is necessary to use more than one strip in a radial section of the tire in order to produce the entire reinforcement in question, for instance at least two strips over the height of the side wall in a carcass, or at least two strips over the width of the belt.

In this technical field, U.S. Pat. No. 3,894,906 discloses a method for producing tire belts which consists in removing lengths of cord and depositing them, one after the other, on a rubber base. However, the technique described is not easily adapted to the production of reinforcements other than those used in belts. Furthermore, the means of applying the cord on the tire belts are not capable of operating at a sufficiently high rate to assure satisfactory productivity.

SUMMARY OF THE INVENTION

An object of the present invention is to propose a means for depositing lengths of cord on a matrix of rubber material and which is very economical to manufacture and use.

Another object of the present invention is to propose a process of manufacture which makes it possible to produce from a spool of cord several types of reinforcements with non-circumferential cord, both in the form of a semi-finished product and directly on a raw blank in the course of manufacture.

One of the objects of the invention with respect to the manufacture of semi-finished products is to propose the means which make it possible to produce reinforcement plies, such as tread plies or carcass plies which are deposited on drums by means of guide corridors known as "servicers".

Another object of the invention with regard to the manufacture of semi-finished products is to propose the means which make it possible to produce strips of a reinforced matrix of rubber material which are necessary for the manufacture of belts, such as those shown in FIGS. 6 and 7 or 10 and 11 of U.S. Pat. No. 1,894,237, containing non-circumferential cords, or else those necessary for the manufacture of the tire described in U.S. Patent application Ser. No. 458,737 filed on Jun. 5, 1995.

The invention proposes a process and apparatus for depositing lengths of cord on a support of raw rubber material in which:

a piece of cord of predetermined length is advanced into a cylindrical chamber within which a rotor provided with transversely oriented vanes rotates, said vanes defining receptacles into which the cord is inserted, one of the side walls of said cylindrical chamber having a cord introduction orifice communicating with said receptacles, the cutting of the cord in order to remove lengths thereof is assured by the edge of each vane, in cooperation with the introduction orifice, rotation of the rotor brings each length of cord toward said support of rubber material where it is retained by adhesion.

If one manufactures a semi-finished product, which is used then on assembly machines in which it is employed packed on spools, the support is a continuously extruded strip of raw rubber on which the said lengths are arranged parallel to each other.

If it is desired to carry out an integrated assembly process, the support is a raw tire in course of manufacture on which the said lengths are arranged at a constant angle at the places contemplated by the architecture of the tire.

DESCRIPTION OF DRAWINGS

The following figures illustrate the invention, without limiting it, and they make it possible clearly to understand how the invention can be reduced to practice.

Figure 4:
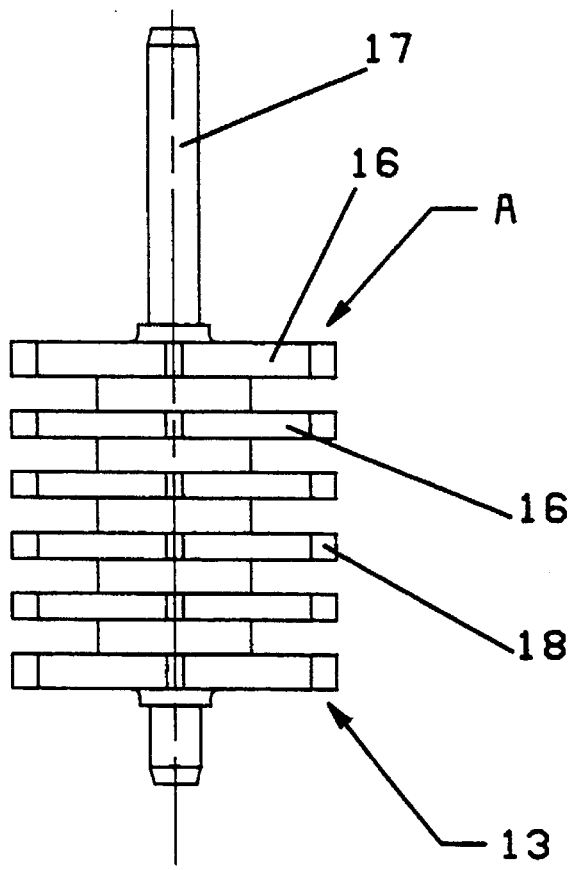
Figure 3:
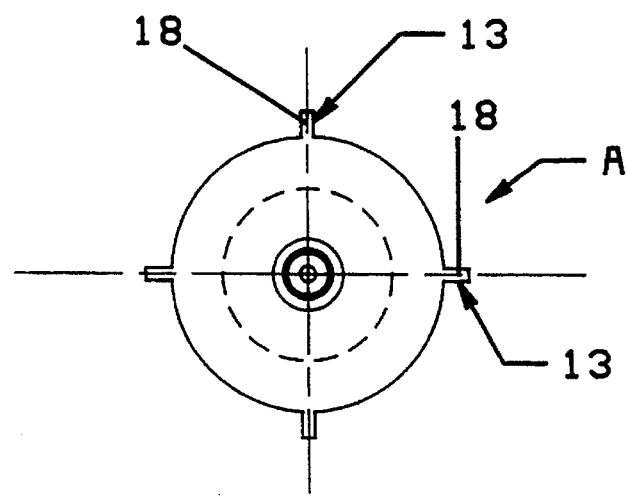
Figure 6:
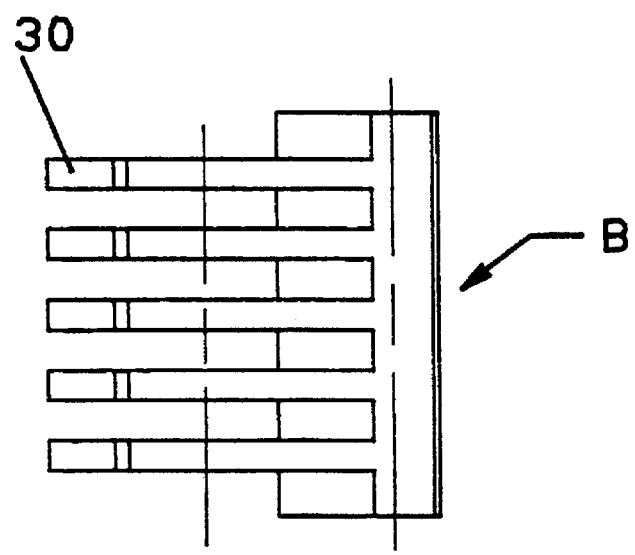
Figure 5:
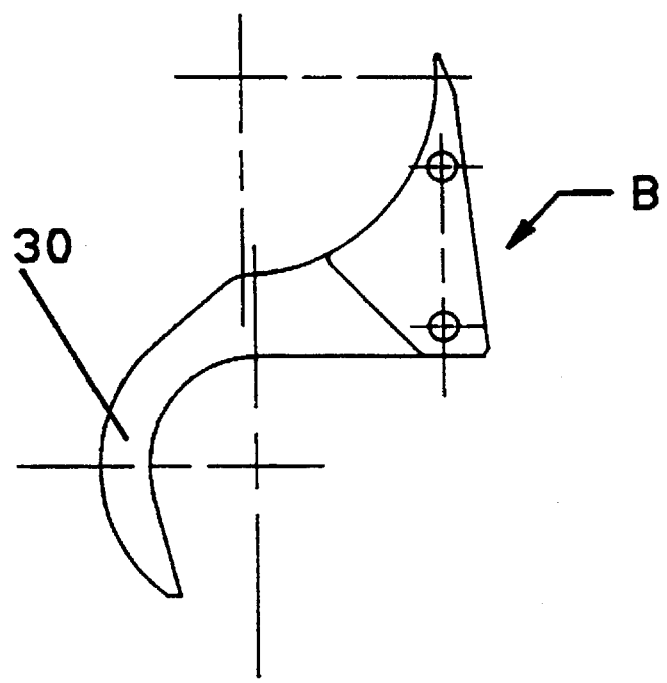
Figure 8:
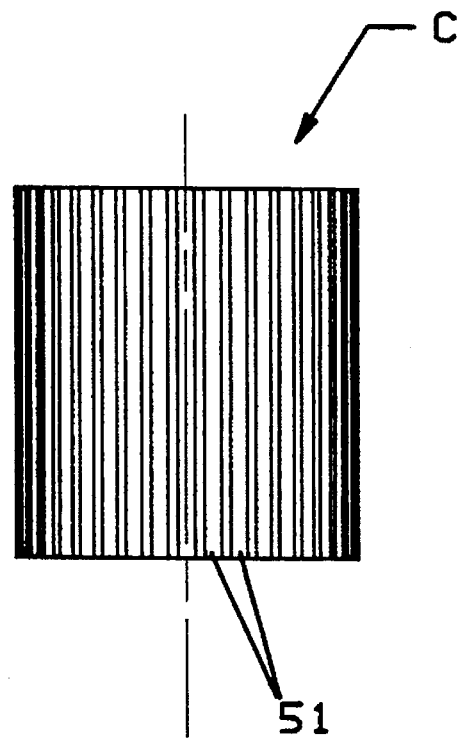
Figure 7:
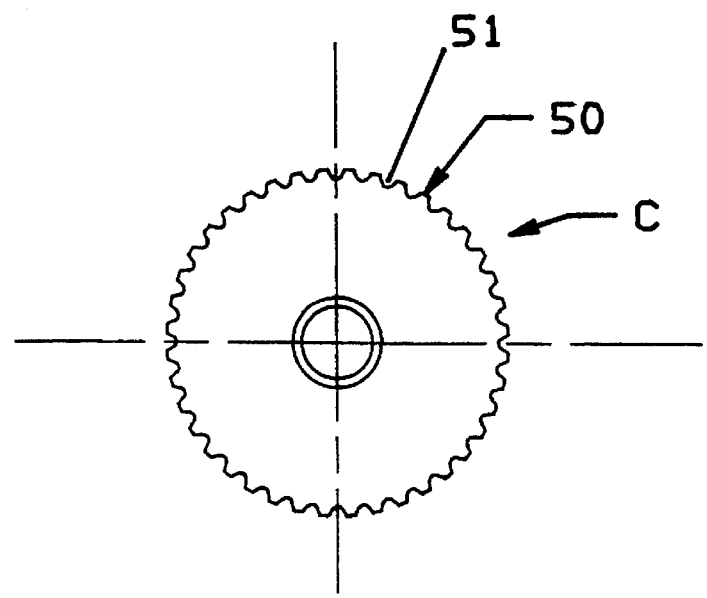

The following figures show, for three components of the apparatus, a side view and then a view in elevation:

FIG. 3 is a side view of component A;

FIG. 4 is a view in elevation of component A;

FIG. 5 is a side view of component B;

FIG. 6 is a view in elevation of component B;

FIG. 7 is a side view of component C;

FIG. 8 is a view in elevation of component C.

DESCRIPTION OF PREFERRED EMBODIMENTS

The essential components of an apparatus in accordance with the invention, which are shown in the different figures, constitute a device 1 which assures the taking up of lengths of cord and transporting said lengths onto said support. As has been stated above, neither the exact nature of the support nor the conditions for the use of the apparatus (directly on an assembling machine or for manufacture of a semi-finished product) forms part of the present invention.

It will be assumed in the following description that the invention is applied to the manufacture of a strip which constitutes a semi-finished product. The support 2 in this case is a ribbon of raw rubber extruded through a die 20 and supported downstream of the extrusion by a wheel 21.

The device 1 comprises a housing 10 within which there is recessed a cylindrical chamber, defined by a cylindrical wall 11 and by two flat side walls 12 perpendicular to the axis aa of said cylindrical chamber. One of the main components of the device is a rotor A which is movable in rotation around the axis aa of said cylindrical chamber. This rotor A is provided with transversely oriented vanes 13, each of said vanes defining, together with at least one part of the cylindrical wall 11 of the cylindrical chamber, a cord receiving receptacle for receiving the cord. An orifice 14 for the introduction of the cord is located in one of the two side walls 12 of the said cylindrical chamber, facing said receptacles. An outlet opening 15 is provided transversely in said cylindrical wall 11.

The outside diameter of the rotor is less than the inside diameter of the cylindrical chamber by an amount at least equal to the thickness of the cord used. As a general rule, this diameter of the rotor is less than the inside diameter of the cylindrical chamber by an amount slightly greater than the diameter of the orifice 14, which, in its turn, is of a diameter slightly greater than the largest of the diameters of the cord which it is desired to be able to use.

In the embodiment described herein, the rotor A has an assembly of disks 16 (see FIG. 6) which are firmly attached to a shaft 17 and therefore held uniformly spaced apart without rotation relative to each other. The teeth 30 of a comb B intermesh with and are interposed (see FIGS. 5 and 6) between the disks 16. Each disk 16 is provided with an identical number of pegs 18 which are uniformly distributed on its periphery. The pegs 18 belonging to different disks 16 are arranged adjoining each other. In the particular case shown here, the pegs 18 are aligned parallel to the axis aa of the rotor A. Each group of adjacent pegs 18 transversely forms one of said vanes 13. More generally, the pegs belonging to different disks 16 form said vanes 13.

In order to prevent the undesirable accumulation of a bundle of lengths in a dead space, the comb is shaped and disposed in such a manner as to remove and guide each length 40 of cord towards the outlet opening 15. It makes it possible to maintain a passage section which is just sufficient for a length 40 of cord: the lengths 40 which have arrived at this place can push themselves one on the other; they thus move towards the outlet opening.

If one desires that each length 40 placed on the rubber ribbon constituting the support 2 be preferably linear in order to make the path assumed by each length 40 very reliable and perfectly reproducible, the teeth 30 of the comb B form, with an opposite wall 31, an outlet corridor 32 in which the clearance present between said teeth 30 and said opposite wall 31 decreases as the cords move towards the outlet 15.

The apparatus may advantageously include a rotatable wheel C the purpose of which is to assist in the depositing of the lengths on the rubber ribbon like a stitcher or a pressing roller. The wheel C is in this case arranged with axis of rotation parallel to the its axis of rotation aa of the rotor A. Between the wheel C and the rubber ribbon there is a slight clearance, less than the thickness of the lengths 40 of cord to be placed in the rubber matrix. The wheel C presents its cylindrical surface 50 to said lengths 40 near said outlet opening 15 and accompanies the lengths 40 until they adhere to the ribbon of raw rubber material.

Furthermore, as shown here, the rotary wheel C can be designed in such a manner as to assure a very uniform spacing between all the lengths 40 of cord which it is desired to deposit parallel to each other. The wheel C comprises, on its cylindrical surface 50, a plurality of linear grooves 51 parallel to the axis of rotation of the wheel C, each capable of receiving a length 40 of cord.

The apparatus described must be associated with a feeder (not shown), capable of introducing the cord used through the orifice 14. In order to assure the unwinding from a storage bobbin, the cord is clamped between two wheels covered by a non-skid covering. At least one of the wheels is driven by a motor. The length of cord introduced through the orifice 14 can therefore be continuously controlled by a knowledge of the tangential speed of the wheels. Any type of cord can be pulled and measured in this manner. Purely for background information, reference can be made to U.S. Pat. No. 5,362,343 which provides information relative to the driving of a cord.

Of course, in order to deposit pieces of cord 40 of a length which is always identical, all of the movements of rotation of the members A, C, and the driving of the cord for its introduction through the orifice 14 are controlled synchronously. It is advisable for each length 40 introduced into a receptacle to have a length which is not greater than the length of the rotor A, measured along a vane 13 from one side wall 12 to the other. The cut pieces of cord preferably are of such length that they take up, except for an operating clearance, substantially the entire length available between side walls 12.

The driving of the device can very simply be effected at constant speed. Likewise, in order that the depositing pitch of the lengths 40 of cord is uniform, the synchronous drive mentioned above is furthermore synchronized with the movement of the support, that is to say, with the movement of the rubber ribbon 2 below the device 1.

The operation of the device is as follows. The rotation of the rotor A assures the cutting of the cord in order to remove lengths 40 due to cooperation between the edge 180 of each vane 13 and the adjacent side wall, more precisely between the edge 180 of the pegs 18 of the disk 16 adjacent the side wall 12, and the material constituting it around the introduction orifice 14. Of course, the clearance between the nearest of the disks 16 and said wall 12 is regulated accordingly. The component materials are selected and/or treated in such a manner as to withstand the stresses due to this cutting by shearing of the cord.

Figure 1:
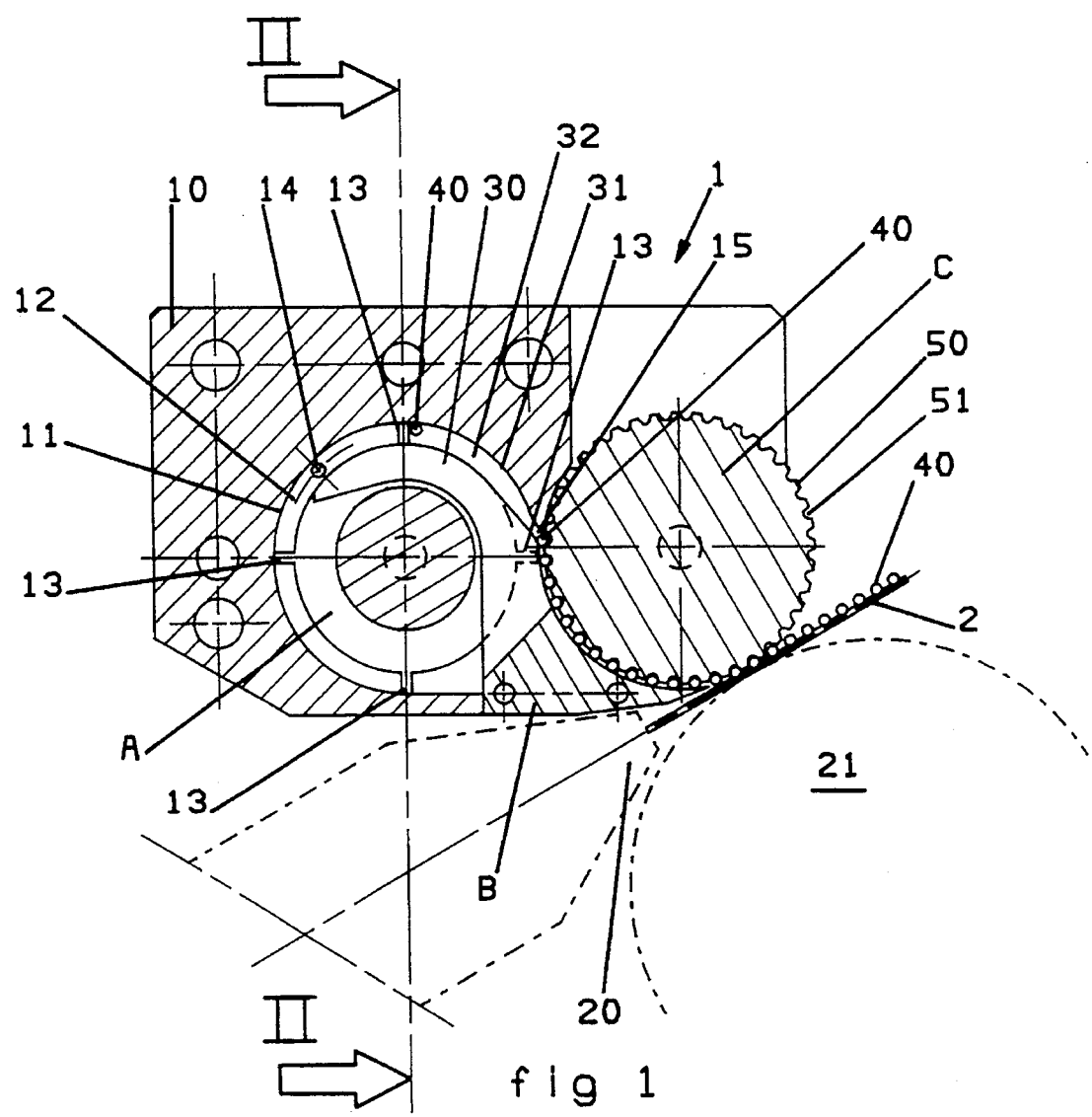
FIG. 1 is a section showing the arrangement of the main parts of an apparatus in accordance with the invention.
Figure 2:
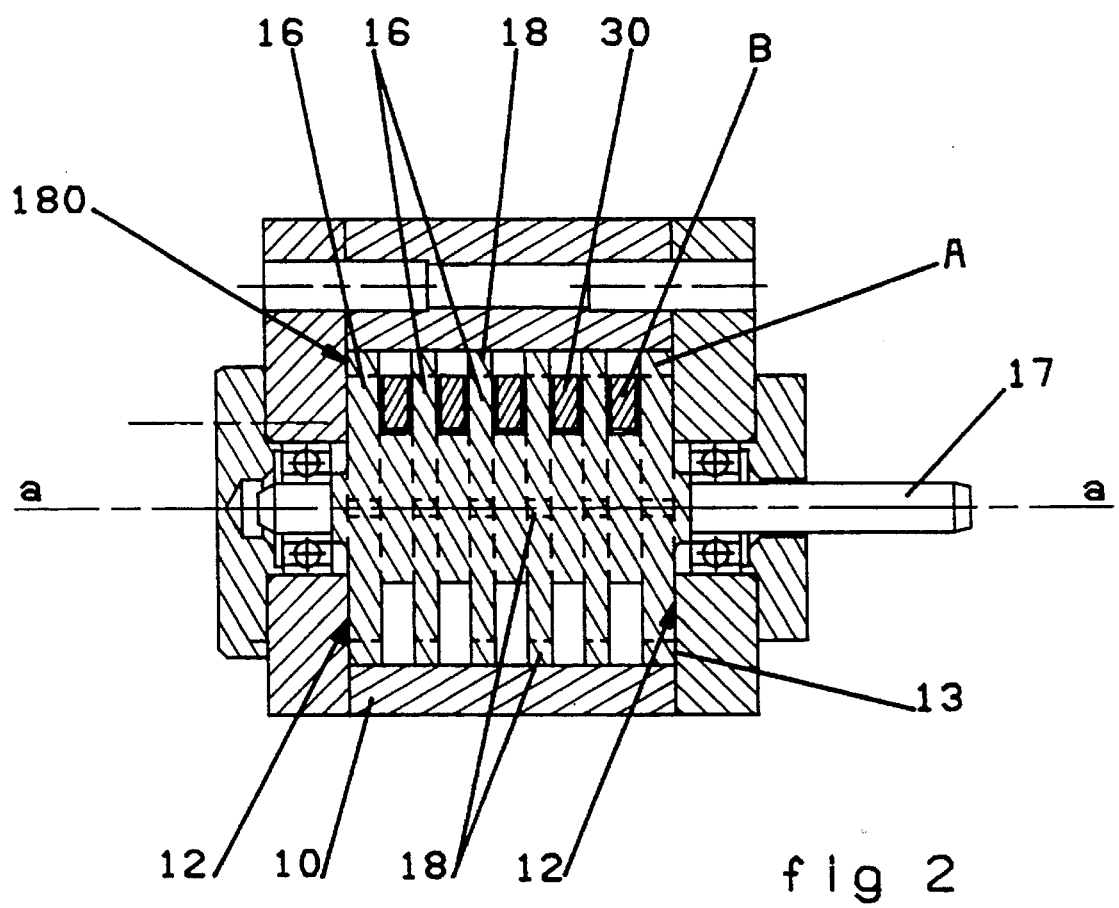
FIG. 2 is a section along the line II—II of FIG. 1.

The rotation of the rotor A then brings each length 40 of cord towards the outlet opening 15 (see FIG. 1), where it is wedged in a groove 51. The rotation of the wheel C then brings each length 40 towards the support 2 of rubber material, in this case a rubber ribbon, on the surface of which it is held by adherence. At the same time, just after the cutting of the said length 40 of cord, the free end of the cord continues to feed into said next receptacle in order to constitute the following length, which will be removed by the following peg 18, that is to say the peg located to the rear with respect to the direction of rotation of the rotor A. The length of cord necessary is thus introduced just before the following peg 18 arrives at the place of the orifice 14 while the preceding vane 13 pushes the last length withdrawn towards the wheel C.

Let us now examine a possibility of adjusting the angle which the lengths of cord 40 form with respect to the direction of travel of the support 2. It is possible to offset the disks 16 with respect to each other in order to obtain a helix angle the value of which corresponds to the angle formed by the lengths 40 on the support. In this case, the cord is preferably introduced into said channel or receptacle at an identical angle. Of course, in operation, the disks 16 remain immovable with respect to each other. In this case, the grooves 51 on the rotary wheel C form the same helix angle.

An apparatus can be provided in which this angle is adjustable, including that of the wheel C, if the latter consists of a stack of disks which can be offset in rotation relative to each other. As a variant, non-adjustable members can be used and one can provide as many rotors A and wheels C as there are depositing angles to be obtained. It is then necessary to replace the pairs of rotor and wheel upon a change in application.

Another possibility which can be used for angles close to 90° could be to incline the device with respect to the direction of travel of the support by a suitable angle. In fact, this possibility can be combined with the preceding one; the device 1 itself is designed or regulated so as to operate optimally at a given characteristic angle, and one can pass through a small range of angles by inclination of the device 1 with respect to the direction of travel of the support 2.

The strip thus formed comprises a matrix of rubber material reinforced essentially by cords 40 which are arranged side by side and extend transversely, that is to say over essentially the entire width of the rubber ribbon 2. Stated differently, the lengths 40 adhered on said ribbon 2 extend from one edge to the other of the strip. The cords 40 are deposited with the angle desired as a function of the use of the strip in the tire which it is desired to manufacture.

In order to produce a strip which can be used in a radial carcass (cords arranged at 90°, in accordance with the customary terminology with regard to angles), by winding, as described in U.S. Patent application Ser. No. 458,737 filed on Jun. 5, 1995, a strip on a Toroidal support on which the raw blank of a tire is assembled, the cords are disposed perpendicularly with respect to the edges of the strip, that is to say perpendicular to the plane of FIG. 1, while the displacement of the strips of ribbon 2 is parallel to the plane of FIG. 1.

In order to produce a strip which can be used to constitute a reinforcement employed in a bead, or a reinforcement used in certain belts, the travel of the ribbon 2 would form the desired angle with respect to the plane of the figure, that is to say, would form the angle at which it is desired that the cords be arranged in the tread ply. The range of angles which can be covered by the invention as described above ranges from 90° to about 45°.

If it is desired to descend to lower values, such as for instance 15°, it is advisable preferably to use a wheel C the axis of rotation of which remains perpendicular to the direction of travel of the support, the grooves 51 being hollowed, by forming the suitable angle with respect to the direction of the axis of the wheel C, as explained above.

We claim:

1. A process for arranging cut lengths of reinforcing cords onto a moving rubber surface comprising feeding the cord through an opening in a chamber containing a moving rotor having cord receiving receptacles around the periphery of the rotor, cutting the cords introduced into the receptacles into predetermined lengths, removing the cords from the receptacles by means intermeshing with the rotor and guiding and advancing the cords onto the movable rubber surface while maintaining the cords in parallel relation.

2. An apparatus for arranging cut lengths of reinforcement cord in parallel on a moving rubber surface comprising a rotor within a chamber, means defining a plurality of cord receiving receptacles around the outer periphery of the rotor, an opening into the chamber through which a cord is fed into the receptacles, means for cutting the cords introduced into the receptacles into predetermined lengths, means intermeshing with the rotor to remove the cords from the receptacles and means for guiding the cords onto the moving rubber surface.

3. An apparatus as set forth in claim 2, including means cooperating with the guiding means for advancing the cut cords in parallel relation onto the movable rubber surface.

4. A process of depositing lengths of cord on a support of rubber material comprising:

advancing a piece of cord a predetermined length into a cylindrical chamber within which a rotor provided with transversely oriented vanes rotates, said vanes defining receptacles within which the cord is inserted, one of the side walls of said cylindrical chamber having an orifice for the introduction of the cord into the receptacles, cutting the cord in order to remove lengths thereof, the cutting being effected by an edge of each vane in cooperation with the introduction orifice, transporting each length of cord by the rotation of the rotor towards said support of rubber material where it is retained by adhesion.

5. A process according to claim 4, in which the support is a continuously extruded rubber belt on which said lengths are arranged parallel to each other.

6. A process according to claim 4, in which the support is a raw tire in the course of manufacture on which said cord lengths are arranged at the place contemplated by the architecture of the tire.

7. An apparatus for the depositing of lengths of cord on a support of raw rubber material comprising:

a cylindrical chamber defined by a cylindrical wall and by side walls perpendicular to the axis of said cylindrical chamber, a rotor which is movable in rotation around the axis of said cylindrical chamber, said rotor being provided with transversely oriented vanes, said vanes defining, with at least a part of the cylindrical wall of each cylindrical chamber, a receptacle to receive the cord, an orifice for the introduction of the cord located in one of the two side walls of said cylindrical chamber facing said receptacles, an outlet opening arranged transversely in said cylindrical wall, and in which the rotation of the rotor assures the cutting of the cord in order to remove lengths thereof, due to the cooperation between the edge of each vane and the adjacent side wall at the introduction orifice, and brings each length of cord towards said support of rubber material on which it is retained by adhesion.

8. An apparatus according to claim 7, in which the rotor comprises an assembly of disks held spaced apart and without relative rotation between each other during operation, the outside diameter of the disks being less than the inside diameter of the cylindrical chamber by at least an amount corresponding to the thickness of the cord, each disk being provided with an identical number of pegs uniformly distributed on its periphery, the pegs belonging to different disks forming said vanes, the apparatus further comprising a comb having teeth which are interspersed between the disks to guide each length of cord towards the outlet opening.

9. An apparatus according to claim 8, in which the teeth of the comb form an outlet corridor with a facing wall and in which the clearance present between said teeth and said facing wall decreases as the cords move towards the outlet opening.

10. An apparatus according to claim 7, including a rotary wheel arranged with its axis of rotation parallel to the axis of rotation of the rotor in order to present its cylindrical surface to said lengths of cord at said outlet opening and to accompany the lengths until they adhere on the support of rubber material.

11. An apparatus according to claim 10, in which the rotary wheel comprises, on its cylindrical surface, a plurality of linear grooves parallel to the axis of rotation of the wheel, each capable of receiving a length of cord.

12. An apparatus according to claim 7, in which the angle which each vane forms with any secant line parallel to the axis of the rotor is adjustable.

\* \* \* \* \*